United States Patent Office 3,192,516
Patented June 29, 1965

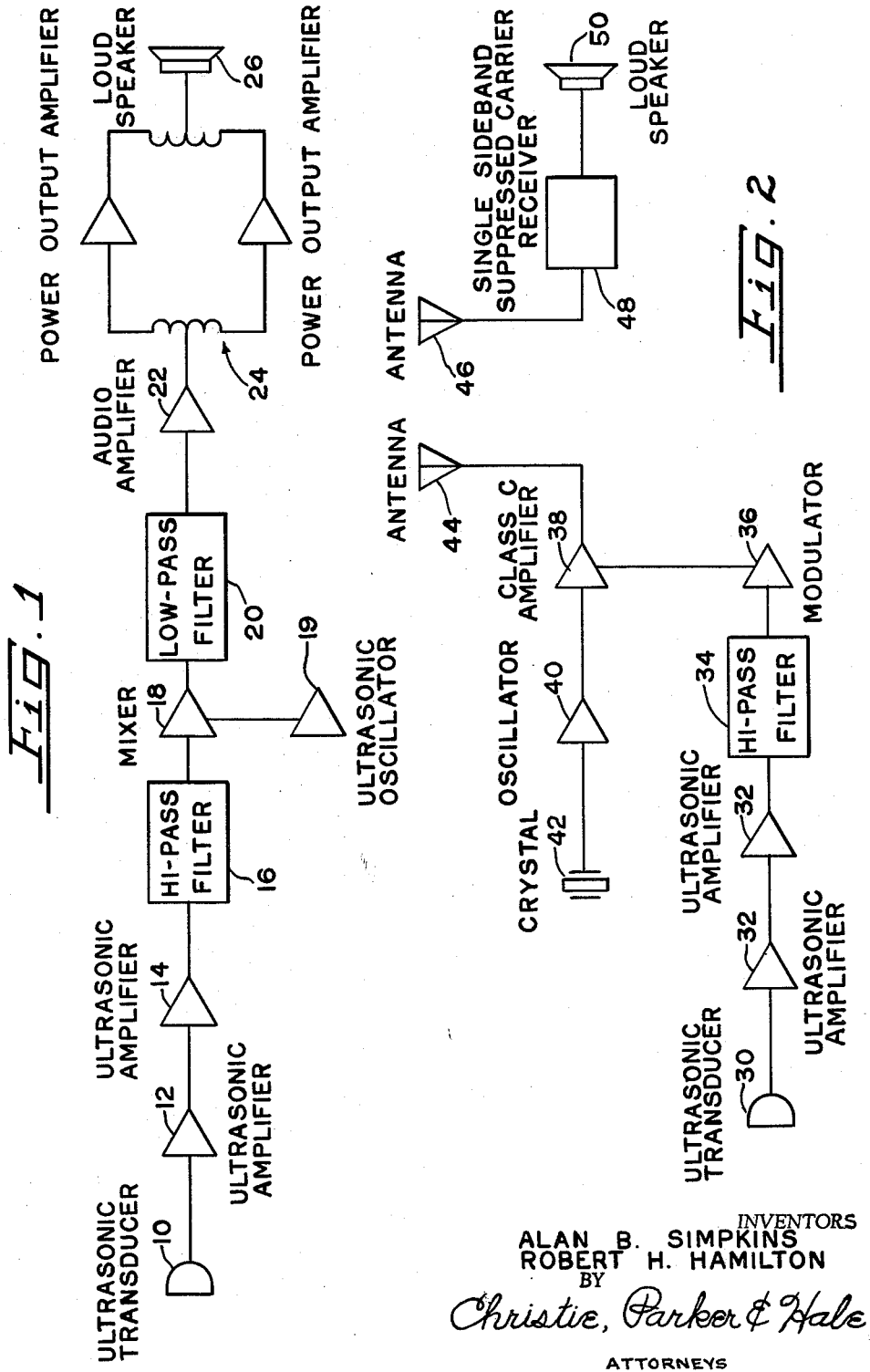

3,192,516
VIBRATION DETECTOR
Alan B. Simpkins, Los Altos, and Robert H. Hamilton, Menlo Park, Calif., assignors, by mesne assignments, to Hewlett-Packard Company, Palo Alto, Calif., a corporation of California
Continuation of application Ser. No. 152,247, Nov. 14, 1961. This application June 25, 1964, Ser. No. 379,441
1 Claim. (Cl. 340—242)

This invention relates to the detection of vibrations in the ultrasonic frequency range, and is a continuation of our copending application U.S. Serial No. 152,247, filed November 14, 1961.

The average human ear can convert vibrations in the range of about 16 at about 18,000 cycles per second into sound. The range above 18,000 c.p.s. is known as the ultrasonic region, and the human ear is insensitive to it.

It is useful to detect or "hear" ultrasonic vibrations generated by both natural and man-made systems. For example, leaks in pressure in vacuum systems, electrical arcs, and operating machinery give off ultrasonic vibrations which are often the earliest indication of trouble. If such vibrations are detected at an early date, expensive trouble can be avoided.

Other examples of utility in detection of ultrasonic vibrations is in anti-intrusion devices. In many cases, a person attempting surreptitious entry generates a substantial amount of ultrasonic noise, although he may be generating little or no audible noise. Certain acts, such as the cutting of wire, manipulation of a combination lock, or the handling of keys generate strong ultrasonic noises. In fact, many of these acts, including the rustling of paper, the turning of a door knob cause noise which is predominantly ultrasonic in nature. Detection of these ultrasonic vibrations makes it possible to sense the presence of an intruder in an area without his being aware that he has been detected.

In addition to direct ultrasonic sounds generated by the movement of an individual, he often arouses animal and insect life as he moves. Many insects and animals produce ultrasonic sounds as alarm when they are disturbed by the movement of human beings. The detection of such ultrasonic alarms discloses the presence of the individual without his being aware that he has caused any disturbance.

An important use of the invention is the detection of leaks in pressure and vacuum systems. Such leaks often generate ultrasonic vibrations, but are otherwise inconspicuous without special testing equipment. The leaks often result in expensive losses, and sometimes create hazardous or toxic conditions. Therefore, it is important that they be located and repaired as quickly as possible. In the past, pressure leaks have been detected by various means, including the use of a soap solution which is applied over an entire pressure system in the hope that the leaking area will be covered and disclosed by the formation of bubbles. Vacuum leaks are more difficult to detect, and have been tested with various means including candle flames. Other systems for detection of vacuum leaks have required introduction into the system of foreign gases which are subsequently detected by various forms of gas detectors, including mass spectrometers.

This invention provides for the sensitive and efficient detection of both pressure and vacuum leaks without the mess of soap bubbles or the introduction of foreign gases which sometimes require the shut-down of the equipment under test.

In accordance with this invention, a vibration in the ultrasonic range is converted into a frequency to the audible range.

In addition to the detection of leaks, the invention is also a powerful tool in the analysis of mechanical action. For example, many mechanical failures are preceded by dry bearings, which first give off ultrasonic noise before the failure is visually, thermally, or audibly apparent. Of particular importance is the fact that the converted ultrasonic noises sound like their audible counterparts and therefore the operator of the detector does not require a training or learning period. Experience has shown that an operator develops complete confidence in the detector after using it for less than one-half hour.

In terms of apparatus, the invention includes the transducer for receiving ultrasonic vibrations and converting them into alternating electric signal above the audio range. An oscillator has its output connected to mix with the signal from the transducer to produce a lower side band signal of a frequency which is the difference between the frequency of the oscillator and that of the transducer signal. Means are provided for selecting from the mixed signals that frequency which is the difference between the two signals.

Preferably, the oscillator output is above the audio range and differs from the transducer signal by about 5,000 c.p.s.

In one form of the invention, the frequency which is the difference between the transducer signal and the oscillator frequency is converted directly into audible acoustical vibrations. In another form, the mixed signals are transmitted to a remote receiver, where it is either recorded or converted into an audible sound. This latter arrangement has the advantage of making it easier to listen to ultrasonic vibrations in areas with high background of audible noise by simply transmitting the ultrasonic frequency signal to a remote area of ambient quiet.

These and other aspects of the invention will be more fully understood from the following detailed description and the accompanying drawing in which:

FIG. 1 is a schematic block diagram of a circuit for converting ultrasonic vibraitons directly into audible noises; and FIG. 2 is a schematic block diagram of a system for transmitting ultrasonic signals to a remote listening station.

Referring to FIG. 1, a conventional ultrasonic transducer 10 has its outlet coupled to a first ultrasonic amplifier 12 connected in cascade arrangement with a second ultrasonic amplifier 14. The output from the second amplifier goes thorugh a high pass filter 16 which is designed to reject substantially all of the signal in the frequency range below about 15,000 c.p.s. The high frequency portion of the signal going through the high pass filter is fed into a mixer 18 which also receives the output of an ultrasonic oscillator 19. Preferably, the ultrasonic oscillator has a frequency which differs from the incoming frequency from the high pass filter by about 3,000 to about 5,000 c.p.s. The resulting family of frequencies from the mixer is subjected to a low pass filter 20 which removes all frequencies with the exception of those below about 5,000 cycles per second. In other words, only the lower side band of the mixed signal goes through the low pass filter.

The low frequency signal from the low pass filter passes through an audio amplifier 22, and then through a power output amplifier stage 24, which drives a conventional loudspeaker 26.

The ultrasonic transducer can be of any conventional type, but preferably it is fairly selective to ultrasonic vibrations and rejects substantially all of the vibrations below about 20,000 c.p.s. In this case, the high pass filter may be omitted since only ultrasonic frequency signals are generated by the transducer. Another technique for rejecting frequencies in the audible range is the use of a balanced modulator circuit in place of the conventional mixer circuit. As is well known, the conventional balanced mixer rejects the oscillator frequency, signal frequency from the transducer, any audio frequencies from the transducer, but passes both side bands. The upper side band is subsequently removed or rejected by the low pass filter. The rejection of all frequencies in the audible range is useful in making the system selectively sensitive to ultrasonic vibrations and to eliminate the background noises in the audible range.

In using the system shown in FIG. 1, the ultrasonic transducer is aimed in the general direction of the suspected ultrasonic vibration, which is converted by the transducer into an electrical signal in the ultrasonic frequency range. To provide adequate sensitivity to ultrasonic noises, the transducer output is amplified by the ultrasonic amplifiers. Following this amplification, the signal is subjected to the high pass filter which has a severe rejection to all frequencies below about 20,000 c.p.s. The ultrasonic signal is then heterodyned with the output from the ultrasonic oscillator in the mixer. Only the lower sideband frequency goes through the low pass filter of the audio amplifier, and it is amplified in the power output stage and converted into audible noise by the loud speaker. Thus, with the system of this invention, it is possible to "hear" ultrasonic vibrations.

In many cases it is desirable to have the listening portion of the system remote from the pickup portion. For example, in listening for leaks on pressurized cable conduits for telephone lines, it is highly desirable to have the pickup device electrically insulated from the sound generating portion of the system. FIG. 2 shows a suitable remote system constructed in accordance with this invention. The output of an ultrasonic transducer 30 passes through a pair of ultrasonic amplifiers 32, a high pass filter 34, a modulator 36, and into a class C amplifier 38 where it is mixed with the output from a transmitting oscillator 40 driven by a crystal 42. The mixed signals from the oscillator in the transducer are sent from a transmitting antenna 44 to a receiving antenna 46, which is connected to the input of a conventional single sideband, carrier-suppressed receiver 48, the output of which is connected to a loudspreaker 50.

Preferably, the output of oscillator 40 is in the 2–10 megacycle range to reduce the size of the transmitting and receiving antennas. The single sideband, carrier-suppressed receiver has the usual receiving oscilaltor (not shown) driven at about the same frequency as the transmitting oscillator 40. With this type of operation, the receiver responds only to the lower sideband, which is the difference between the frequency of the oscillator in the receiver and the sum of the transmitting oscillator and signal frequency mixed with it from the ultrasonic transducer. For example, if the transmitting oscillator operates at 2 megacycles, and the ultrasonic transducer receives sound vibrations at 40 kc., then the signal from the transmitting antenna includes the carrier frequency of 2 megacycles, the upper sideband of 2.04 mc., and the lower sideband of 1.96 mc. The receiver is set to suppress the carrier frequency and the upper sideband so that only the lower sideband is received and mixed with the oscillator output of the receiver, which is driven at about 1.965 mc. so that the output is a 5000 c.p.s. sound from the loudspeaker.

If desired, the ultrasonic signal is transmitted directly through space, received at the receiving antenna, mixed with a suitable oscillator frequency to produce a lower sideband in the audio range, which is then converted into sound as previously described.

The remote system shown in FIG. 2 is of particular use in checking systems such as telephone lines which are enclosed in pressurized conduits. For safety reasons, it is desirable to avoid electrical connections from the sensing end of the equipment to ground. With the apparatus of FIG. 2, the ultrasonic transducer and its associated components are mounted on a suitable insulated pole (not shown) so that the sensing element can be moved close to the pressurized conduit without any danger of establishing a conductive path to ground. When the pickup instrument is moved into the vicinity of a leak, ultrasonic noises are picked up, used to modulate the output of the transmitting oscillator, and are transmitted to the antenna, receiver, and loudspeaker on the ground.

With the apparatus of FIG. 2, only one workman is needed to survey a conduit for leaks. Moreover, he can move along the conduit much more quickly than is now possible with the present procedure which requires the application of soap solution to the cable exterior in an effort to locate leaks by the formation of bubbles.

The remote pickup system of FIG. 2 is also useful when looking for ultrasonic vibrations in areas where there is large ambient audible noise. For example, in an automobile shop or in the vicinity of a jet aircraft engine, the ambient noise may be of such a level as to interfere with the converted ultrasonic vibrations coming from the loudspeaker. In such a case, a loudspeaker with its antenna and receiver are placed in a relatively quiet area while the ultrasonic transducer is used in an area of loud ambient audible noise.

I claim:

A method for detecting a gas leak in a system surrounded by gas, the method comprising the steps of disposing an ultrasonic transducer in the gas surrounding the system in the vicinity of the leak to pick up ultrasonic mechanical vibrations at about 40,000 cycles per second produced by the leak to generate an A.C. electrical signal from the transducer with a frequency corresponding to the mechanical vibrations, mixing said electrical signal with an electrical oscillation having a frequency which differs from that of the signal by about 3,000 to about 5,000 c.p.s. to generate a beat signal having a frequency of about 3,000 to about 5,000 c.p.s., applying said beat signal to a sonic transducer to generate an audible sound corresponding to said beat signal and to indicate the presence of a leak in the system, aiming the transducer at the system, and moving the transducer along the system while listening for an audible sound which indicates a leak in the system.

References Cited by the Examiner

UNITED STATES PATENTS

| 2,008,934 | 7/35 | Smith | 73—40.5 |
| 2,017,695 | 10/35 | Hahnemann | 340—258 |
| 2,447,333 | 8/48 | Hayes | 179—110.3 |
| 2,460,316 | 2/49 | Trent | 340—258 |
| 3,028,450 | 4/62 | Manning | 340—242 |

OTHER REFERENCES

Shilling: Prelimary Report on Supersonic Signalling, Office of Scientific Research and Development, September 18, 1944, 13 pp.

NEIL C. READ, *Primary Examiner.*